(12) United States Patent
Le-Calve et al.

(10) Patent No.: US 6,568,517 B2
(45) Date of Patent: May 27, 2003

(54) RATCHET FREE WHEEL DEVICE

(75) Inventors: Marc Le-Calve, Cerelles (FR); Christophe Houdayer, Tours (FR); Virginie Hamada, Tours (FR)

(73) Assignee: SKF France, Clamart (FR)

( * ) Notice: Subject to any disclaimer, the term of this patent is extended or adjusted under 35 U.S.C. 154(b) by 0 days.

(21) Appl. No.: 09/927,478

(22) Filed: Aug. 13, 2001

(65) Prior Publication Data

US 2002/0027055 A1 Mar. 7, 2002

(30) Foreign Application Priority Data

Sep. 1, 2000 (FR) ............................................. 00 11186

(51) Int. Cl.[7] ........................... F16D 41/08; F16D 41/12
(52) U.S. Cl. ................... 192/46; 192/45.1; 192/69.6; 192/995
(58) Field of Search ....................... 192/45.1, 46, 41 R, 192/43.1, 35, 69, 69.6, 69.61, 69.62, 89.2

(56) References Cited

U.S. PATENT DOCUMENTS

| | | | |
|---|---|---|---|
| 5,004,083 A | * 4/1991 | Lohman | ................... 192/217.1 |
| 5,597,057 A | 1/1997 | Ruth et al. | |
| 5,927,455 A | * 7/1999 | Baker et al. | ................... 192/36 |
| 5,967,277 A | * 10/1999 | Walter | ........................... 192/35 |
| 6,032,774 A | * 3/2000 | Gadd | ............................ 192/35 |
| 6,290,044 B1 | * 9/2001 | Burgman et al. | ........... 188/82.3 |

FOREIGN PATENT DOCUMENTS

| | | |
|---|---|---|
| DE | 44 31 068 | 3/1996 |
| EP | 0 522 983 | 1/1993 |
| FR | 2188551 | 1/1974 |

* cited by examiner

Primary Examiner—Saul Rodriguez
(74) Attorney, Agent, or Firm—Smith, Gambrell & Russell, LLP

(57) ABSTRACT

Ratchet free wheel device comprising a first element 1 provided with cavities 14, a number of ratchets 28 able to project into said cavities 14, and a second element 2 for supporting the ratchets 28 so that the second element 2 rotates as one with the first element 1 in one direction of relative rotation of said first and second elements and is free to rotate in an opposite direction of relative rotation. The device comprises a means of controlling the ratchets 28 which is capable of preventing them from projecting into said cavities 14 so that the second element 2 is free to rotate with respect to the first element 1 in two opposite directions of relative rotation of said first and second elements when said control means is active.

28 Claims, 5 Drawing Sheets

RATCHET FREE WHEEL DEVICE

FIELD OF INVENTION

The invention relates to the field of ratchet free wheels allowing unidirectional transmission of torque between two elements. Such free wheels are used, amongst other things, in drivelines for automobiles comprising automatic transmissions and in the hubs of the driven wheels of bicycles.

BACKGROUND OF THE INVENTION

A ratchet free wheel generally comprises two concentric plates placed face to face. A first plate is equipped on one of its flat faces with a circular path equipped with recesses each formed with a ramp and with an abutment surface arranged at the opposite end of the ramp. Ratchets are supported by the second plate and collaborate with the recesses of the first plate.

When the plates are given a relative angular displacement in one direction about the axis of rotation, the ratchets slide with respect to the ramps and thus manage to leave a recess to pass from one recess to another without transmitting torque. When the relative movement is in the opposite direction, at least one ratchet collaborates with an abutment surface of a recess of the first plate. The two plates are therefore connected in terms of rotation and can transmit torque between them; please see documents EP-A-0 522 983 and FR-A-2 188 551.

This then yields a system of unidirectional connection between two elements capable of transmitting torque between a driving element and a driven element, in just one direction.

SUMMARY OF THE INVENTION

The present invention sets out to improve ratchet free wheels.

More particularly, the present invention proposes to provide a ratchet free wheel with a disengagement means.

What happens is that in certain applications, such as gear or sprocket couplings, it may be advantageous to have a disengagable system that can operate either as a unidirectional connection in terms of rotation between two elements or as a system the two elements of which are completely independent of one another in terms of rotation and can transmit no torque regardless of their relative direction of rotation.

The ratchet free wheel device according to one aspect of the invention comprises a first element provided with uniformly distributed cavities, a number of ratchets able to project into said cavities, and a second element for supporting the ratchets so that the second element rotates as one with the first element in one direction of relative rotation of said first and second elements and is free to rotate in an opposite direction of relative rotation. Each ratchet comprises a head able to project into said cavities and a shank collaborating with said control means. The device comprises a means of controlling the ratchets which is capable of preventing them from projecting into said cavities so that the second element is free to rotate with respect to the first element in two opposite directions of relative rotation of said first and second elements when the control means is active.

Benefit is derived from the possibility of disengaging the free wheel device by activating the control means. This then switches from a unidirectional connection to a free two-directional movement.

As a preference, the device comprises an operating element able to collaborate with the ratchets so as, in an inactive position, to leave them free to project into said cavities and, in an active position, to keep them out of said cavities.

The operating element may be in the form of an annular component comprising a radial flange pierced with holes through which the ratchets can pass, and a radial rim designed to collaborate with a fork. The rim and the flange may be connected by a tubular portion.

In one embodiment of the invention, the device comprises a control system collaborating with the operating element and determining whether it is in the inactive or in the active position.

The head advantageously has a diameter greater than that of the shank. The head and the shank may be coaxial.

Advantageously, the shank of each ratchet projects from the second element away from said cavities and is equipped with a retaining means capable of collaborating with said control means. The retaining means will be unidirectional in terms of translation. In other words, the control means may, by virtue of the retaining means, exert on the shank of a ratchet a force directed away from the head of the ratchet and will be unable to exert on the shank of a ratchet a force directed toward the head of the ratchet.

In one embodiment of the invention, the retaining means comprise a washer fixed to the shank of a ratchet, so that a portion of the control means is arranged between the second element and the washer. The washer may be of the frusto-conical type, forcibly fitted onto the shank of a ratchet in order to provide axial retention.

In one embodiment of the invention, each ratchet has an axisymmetric shape, the head being cylindrical, and the shank also being cylindrical. Such a ratchet is very economical to manufacture.

In one embodiment of the invention, each ratchet comprises a radial bearing surface between the head and the shank, a spring being arranged around the shank and bearing against said bearing surface.

In one embodiment of the invention, the spring also bears against the second element and tends to cause each ratchet to project into said cavities.

More specifically, the first element is of annular shape with an L-shaped cross section with a radial portion and an axial portion. A circular path with recesses is formed on the lateral face of the radial portion arranged on the same side as the axial portion. Each recess has a flat bottom delimited on one side in the circumferential direction by an inclined ramp and on the opposite side by an abutment surface directed axially.

The second element also has an annular shape of L-shaped cross section with a radial portion and an axial portion and is mounted concentrically with respect to the first element. The radial portions of the two elements are arranged facing one another via one of their faces. The second element has a certain number of drillings or cells intended to accommodate the axially mobile ratchets.

The ratchets have the form of a cylindrical piston and are arranged in the drillings of the second element while being thrust axially by a return spring toward the first element to collaborate with the recesses of the first element via one of their ends known as the head of the ratchet.

The second element is centered on the first element by means of a cylindrical bearing surface arranged in its bore and collaborating with a cylindrical bearing surface formed on the periphery of the axial portion of the first element. The axial portion of the second element protrudes slightly with respect to the large lateral face of the first element, thus allowing a circlip to be fitted in a groove formed in the free end of the axial portion of the second element and thus allowing the two elements to be secured together axially.

The ratchet free wheel device thus formed is mounted, on the one hand, on a shaft via the first element and, on the other hand, in a housing via the second element. The angular connection between the housing and the free wheel device is provided by its splines. The connection between the shaft and the free wheel device may also be by means of splines.

In one direction of relative rotation of shaft and housing, the ratchets can move up the ramps of the recesses and sink axially into the cells to then drop into the next recess under the thrust of the associated spring, and so on. In the opposite direction of rotation, the ratchets come into contact with the abutment surface of the recesses and cannot pass into the next recess. The two plates are thus angularly connected in this direction and may thus transmit torque via the piston-form ratchets.

Of course, the device will initially be designed so that the number of ratchets simultaneously in engagement with the abutment surfaces is a function of the torque that is to be transmitted. As the torque that can be transmitted with this type of ratchet free wheel is very high, it is often possible for the desired torque to be transmitted with just one ratchet in engagement. It is therefore possible to envisage a number of ratchets other than the number of recesses and for them to be distributed angularly in such a way that the take-up of torque or locking when switching from free wheel operation to torque-transmitting operation occurs in an angle smaller than the angle between two recesses.

By way of example, if the free wheel has ten recesses and ten ratchets simultaneously in torque-transmitting engagement, the angular play or torque take-up angle will be equal to 360°/10=36°. If the free wheel has ten uniformly distributed recesses and eleven ratchets, also uniformly distributed, just one ratchet may be in torque take-up engagement. The switch from the free wheel position to the drive position occurs over a maximum angle of 360°/(10× 11)=3° and 16 minutes.

BRIEF DESCRIPTION OF THE DRAWINGS

The present invention will be better understood upon reading the detailed description of a number of embodiments taken by way of entirely nonlimiting examples and illustrated by the appended drawings, in which.

DETAILED DESCRIPTION

Figure 1:
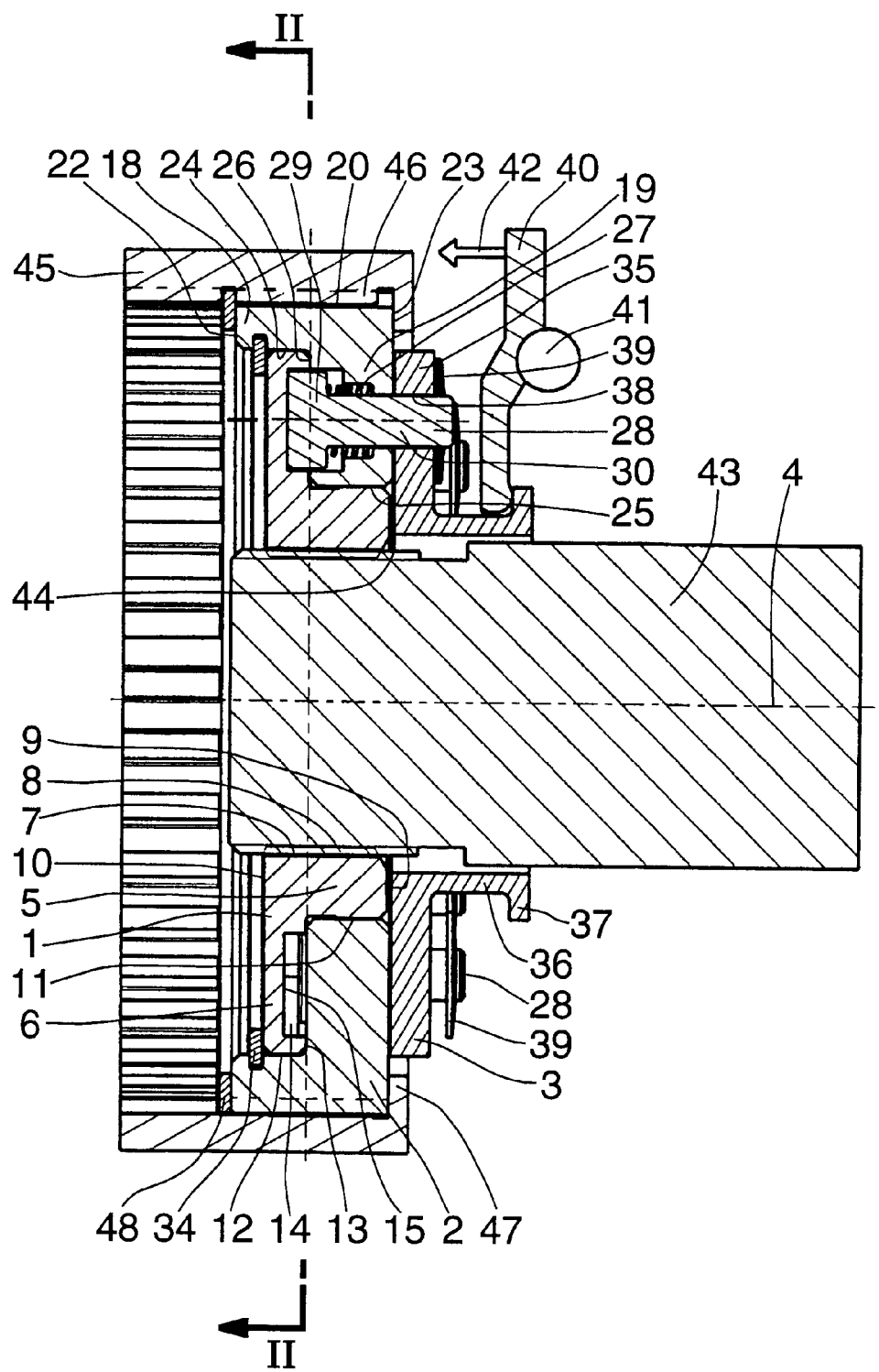
FIG. 1 is a view in axial section of a free wheel device according to a first embodiment of the invention.

As can be seen in FIGS. 1 to 5, the free wheel device illustrated comprises an inner plate 1, an outer plate 2 and an operating plate 3, all coaxial about an axis of rotation 4. The inner plate 1 has the overall form of an annulus of L-shaped cross section with an axial portion 5 and a radial portion 6 extending outward from one of the axial ends of the axial portion 5. The axial portion 5 is provided with an inner surface 7 provided with a number of teeth 8 forming a rotational-coupling means. The axial portion 5 is supplemented by a radial end surface 9 and by a radial end surface 10 opposite the previous one and common to the radial portion 6. The axial portion 5 is also provided with a cylindrical outer surface 11 bounded at one end by the radial surface 9 and at the opposite end by the radial portion 6.

Aside from being provided with the radial surface 10 common to the axial portion 5, the radial portion 6 is also provided with a cylindrical outer surface 12 and with a radial surface 13 provided with a number of cavities or hollow recesses 14 which are uniformly distributed on the circumference. Each recess 14 comprises a flat bottom 15 bounded on one side in the circumferential direction by an inclined ramp 16 and on the opposite side by an abutment surface 17 directed axially. The collection of recesses 14 forms a circular path.

The outer plate 2 has the overall form of an annulus with an L-shaped cross section and comprises an axial portion 18 and a radial portion 19. The axial portion 18 comprises an outer surface 20 provided with a number of teeth forming a rotational-coupling means, a radial end surface 22 and another radial end surface 23 common with the radial portion 19, and an inner cylindrical axial surface 24 formed between the radial surface 22 and the radial portion 19. The radial portion 19 extends outward from the axial portion 18 and, aside from the radial surface 23, comprises a cylindrical axial inner surface 25 and a radial surface 26 on the opposite side to the radial surface 23.

A number of drillings 27 with axes parallel to the axis 4 pass through the radial portion 19.

The free wheel device also comprises a number of ratchets 28 in the form of cylindrical pistons, each arranged in a drilling 27 of the outer plate 2. Each ratchet 28 comprises a large-diameter portion also known as the locking portion 29, and a small-diameter portion also known as the control portion 30. A spring 31 is arranged around the control portion 30 of each ratchet 28 and bears, at one end, on a step 32 formed in the drilling 27 and, at the other end, on a radial annular surface 33 delimiting the control portion 30 of the locking portion 29. The spring 31 exerts on the ratchet 28 with which it is associated, a preload force which tends to cause the ratchet to project from the drilling 27 toward the path formed by the recesses 14 of the inner plate 1.

In the assembled state, illustrated in FIG. 1, the locking parts 29 of the ratchets 28 are arranged axially between the inner plate 1 and the outer plate 2. The inner plate 1 is mounted in the outer plate 2, concentrically with respect to the latter through suitable adjustment of the outer surface 12 of the inner plate 1 with the inner surface 24 of the outer plate, on the one hand, and of the outer surface 11 of the inner plate 1 with the inner surface 25 of the outer plate 2, on the other hand. The radial surface 13 of the inner plate 1 is in contact with the radial surface 26 of the outer plate 2. The plates 1 and 2 are held axially in this position by a circlip 34 arranged in an annular groove formed in the inner surface 24 of the outer plate 2, said surface forming an axial abutment for the radial surface 10 of the inner plate 1.

In one direction of relative rotation of the plates 1 and 2, the locking portion 29 of one of the ratchets 28 comes into contact with the abutment surface 17 of one of the recesses 14 and the driving plate drives the driven plate in rotation. There is therefore coupling.

In the other direction of rotation, the locking portion 29 of the ratchets 28 slides along the path formed by the collection of recesses 14. Each active portion 29 comes successively into contact with the bottom 15 of a recess 14, with the adjacent ramp 16 which then causes the ratchet 28 to leave the recess 14 and compression of the spring 31, with the radial surface 13 remaining between two recesses 14, then once again with the bottom 15 of the next recess 14, the ratchet 28 moving axially in the opposite direction after it has negotiated the abutment surface 17. In this direction of relative rotation, the driving plate does not drive the other plate. Operation is therefore as a unidirectional coupling.

The operating plate 3 has the overall shape of a circle with a radial portion 35 in contact with the radial surface 9 of the inner plate 1 and with the radial surface 23 of the outer plate 2, an axial portion 36 extending from the small-diameter end of the radial portion 35 away from the plates 1 and 2 and an annular rim 37 extending radially outward from the opposite end of the axial portion 36 to the plates 1 and 2. The radial portion 35 is pierced with a number of drillings 38 each capable of accommodating the control portion 30 of a ratchet 28. More specifically, the control portion 30 projects beyond the radial portion 35 and is equipped with an axial retaining means, here in the form of a frustoconical locking washer 39. The operating plate 3 and the outer plate 2 rotate as one.

The operating plate 3 can be actuated axially by a control system comprising a control lever 40, capable of pivoting about a point 41 formed by a spindle or ball joint. The control lever has been depicted very schematically for the purposes of making the drawing clearer, and does not show details such as the anti-friction devices (roller for example) which may be used in the zone of the lever which is intended to contact the operating plate. The pivoting of the control lever 40 in the direction of the arrow 42 in FIG. 1 causes its end in contact with the axial rim 37 to move in the opposite direction to said arrow 42 and causes the operating plate 3 to be moved in translation, also in the opposite direction to the arrow 42, the operating plate 3 in its movement driving the washers 39 with which it is or comes into contact and the ratchets 28, to which said washers are secured. At the end of the translational movement, the free wheel device is in the position illustrated in FIG. 5. The locking portions 29 of the ratchets 28 are away from the path formed by the collection of recesses 14 and therefore prevented from projecting into said recesses 14.

In other words, the plates 1 and 2 can rotate freely with respect to one another in both directions of relative rotation, without the intervention of the ratchets 28.

If the control lever 41 is pivoted in the opposite direction, so that it returns to its initial position illustrated in FIG. 1, the springs 31 exert a return force on the operating plate 3 via the ratchets 28 and the washers 39 and the operating plate 3 moves in the direction of the plates 1 and 2 until it comes into contact with their respective radial surfaces 9 and 23. The ratchets 28 are then able to regain their unidirectional coupling function and, depending on their circumferential position, will find themselves either in the position illustrated in FIG. 3 with the locking part 29 in contact with the radial surface 13, or projecting into a recess 14, for example in the position illustrated in FIG. 4, with the locking portion 29 in contact with an abutment surface 17. The free wheel device therefore regains its unidirectional coupling function.

The control lever 40 may be actuated by various means such as mechanical, electrical or hydraulic actuators. It would also be possible, without departing from the scope of the invention, to envisage a control system other than the lever for causing the translational movement of the plate.

In general, the free wheel device can be used with a shaft 43 provided on part of its exterior surface with a set of teeth 44 capable of collaborating with the teeth 8 of the interior surface of the inner plate 1, and with an outer annulus 45 surrounding the outer plate 2 and provided with a set of teeth 46 capable of collaborating with the teeth 21 of the outer surface 20 of the outer plate 2. The outer plate 2 will be secured axially to the outer annulus 45, on the one hand by a radial rim 47 directed inward and, on the other hand, by a circlip 48 arranged on the opposite side to the rim 47 and mounted in a groove of said outer annulus 45.

In other words, in one direction of relative rotation of the shaft 43 and of the outer annular annulus 45, the locking portion 29 of the ratchets 28 can move up along the ramps 16 of the recesses 14 and sink axially into the drillings 27 to then drop back into the bottom 15 of the next recess under the thrust of the spring 31, and so on. Rotation is thus allowed. In the opposite direction of relative rotation, at least one of the ratchets 28 comes into contact with the abutment surface 17 of the recesses 14 and cannot pass into the bottom of the next recess. The two plates 1 and 2 are therefore angularly connected in this direction and can transmit torque.

Figure 2:
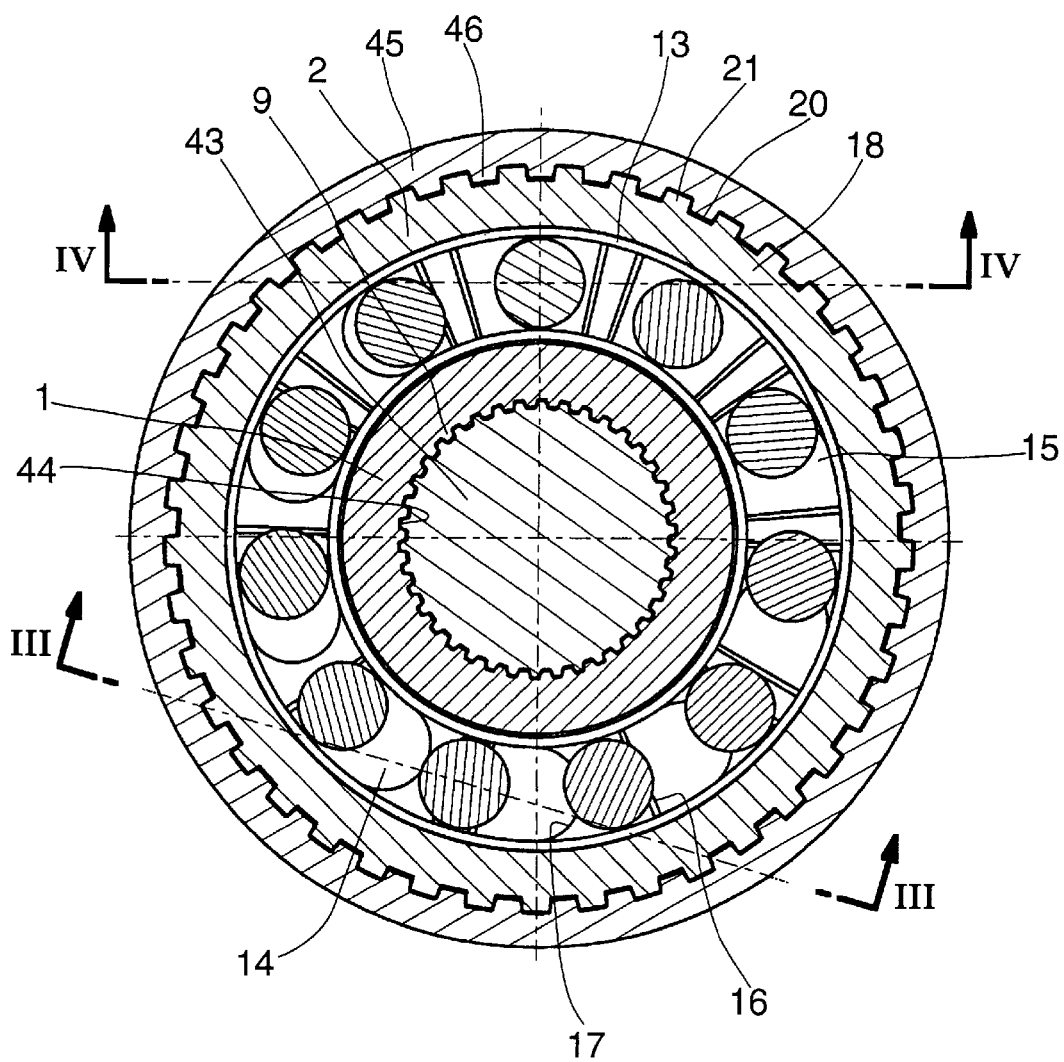
FIG. 2 is a view in section on II—II of FIG. 1.
Figure 3:
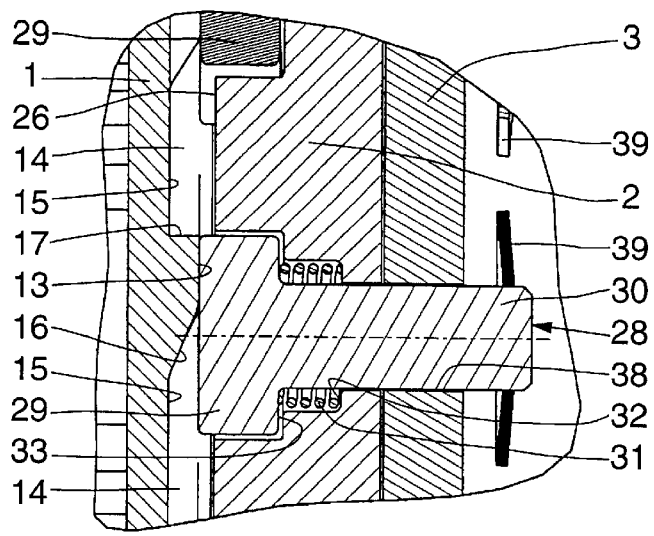
FIG. 3 is a part view in section on III—III of FIG. 2 in the engaged state.
Figure 4:
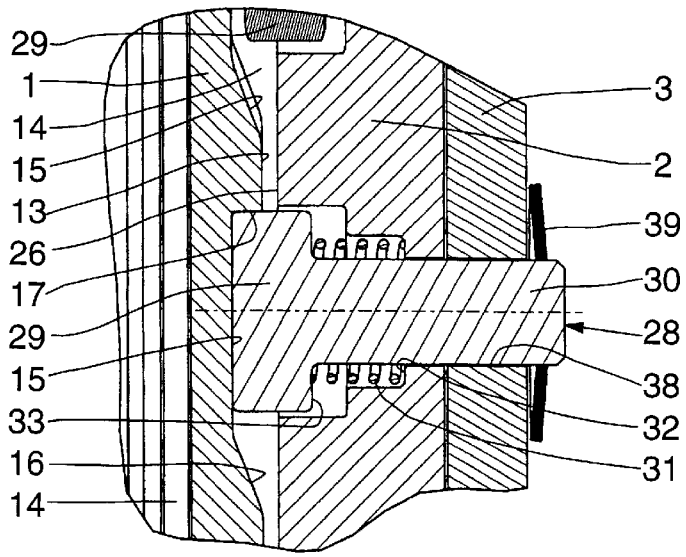
FIG. 4 is a part view in section on IV—IV of FIG. 2 in the engaged state.
Figure 5:
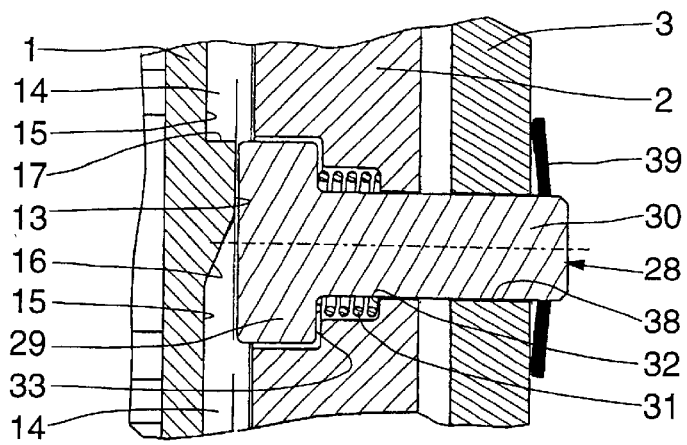
FIG. 5 is a view corresponding to FIG. 3 in the disengaged state.

The free wheel device will be designed so that the number of ratchets 28 in engagement with the abutment surfaces 17 is a function of the torque that is to be transmitted. As the torque that can be transmitted with this type of ratchet free wheel is very high, it is often possible to transmit the desired torque with just one ratchet 28 in engagement with an abutment surface 17. There can therefore be a number of ratchets 28 different from the number of recesses 14 and distributed angularly in such a way that the uptake of torque when switching from free wheel operation to torque-transmitting operation occurs over an angle smaller than the angle between two recesses or smaller than the angle between two ratchets. In FIG. 2, it can be seen that there are ten uniformly distributed recesses 14 and eleven ratchets 28. The switch from the free wheel position to the driving position is over an angle which varies from 0° to 3° 16 minutes.

The axial movement of the operating plate 3 under the action of the control lever 40 causes, through the locking washers 39 of each ratchet 28, the locking portions 29 of the ratchets 28 to move up and sink into the drillings 27 and the locking portions 29 to disengage from the recesses 14 of the inner plate 1. The free wheel is thus disengaged. The shaft 43 and the outer annulus 45 are totally uncoupled and can each rotate in both directions independently of one another. If action on the control lever 40 is released, the return springs 31 of the ratchets 28 exert a return force tending to cause the outer plate 2 and the operating plate 3 to move closer together axially and tending to cause the ratchets 28 to reengage in the path of the inner plate 1 which has the recesses 14. The free wheel once again operates for unidirectional transmission of torque. It will be understood that the springs 31 have a dual function of returning the ratchets 28 and of returning the outer plate 2.

As an alternative, it is possible to envisage an outer plate equipped with recesses and an inner plate equipped with drillings to support ratchets.

The inner plate 1 can be driving or driven and the outer plate 2 can be driven or driving.

Figure 6:
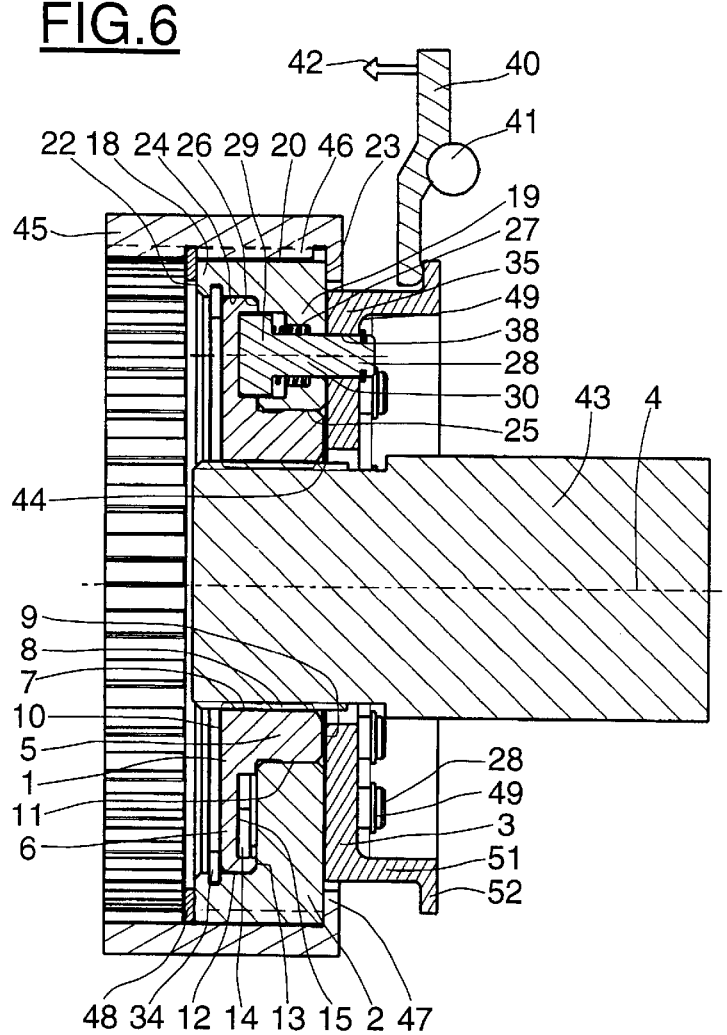
FIG. 6 is a view in axial section of a free wheel device according to a second embodiment of the invention.
Figure 7:
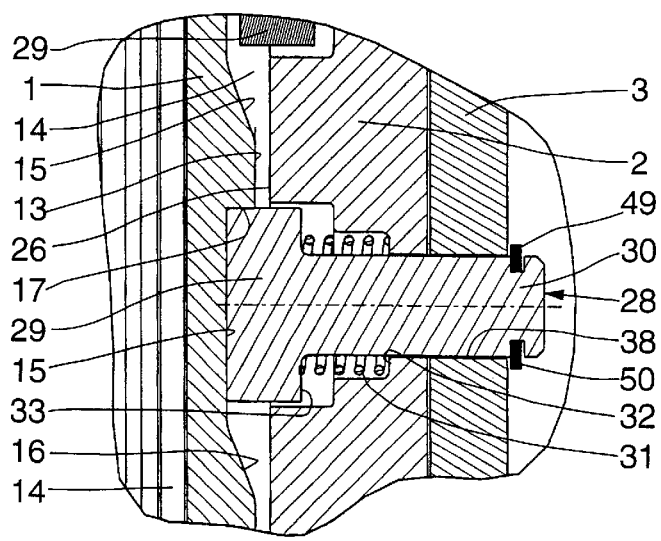
FIG. 7 is a detailed view of FIG. 6.

The embodiment illustrated in FIGS. 6 and 7 is similar to the previous one, except that the means of axially retaining the ratchets 28 with respect to the operating plate 3 consist of circlips 49, each housed in an annular groove formed near the free end of the control portion 30 of a ratchet 28 and capable of collaborating with the radial portion 35 of the operating plate 3. The operating plate 3 here comprises an axial portion 51 formed from the large-diameter end of the radial portion 35, and a radial annular rim 52 directed outward from the opposite end of the axial portion 51 to the radial portion 35. The control lever 40 is designed to collaborate with the rim 52.

Figure 8:
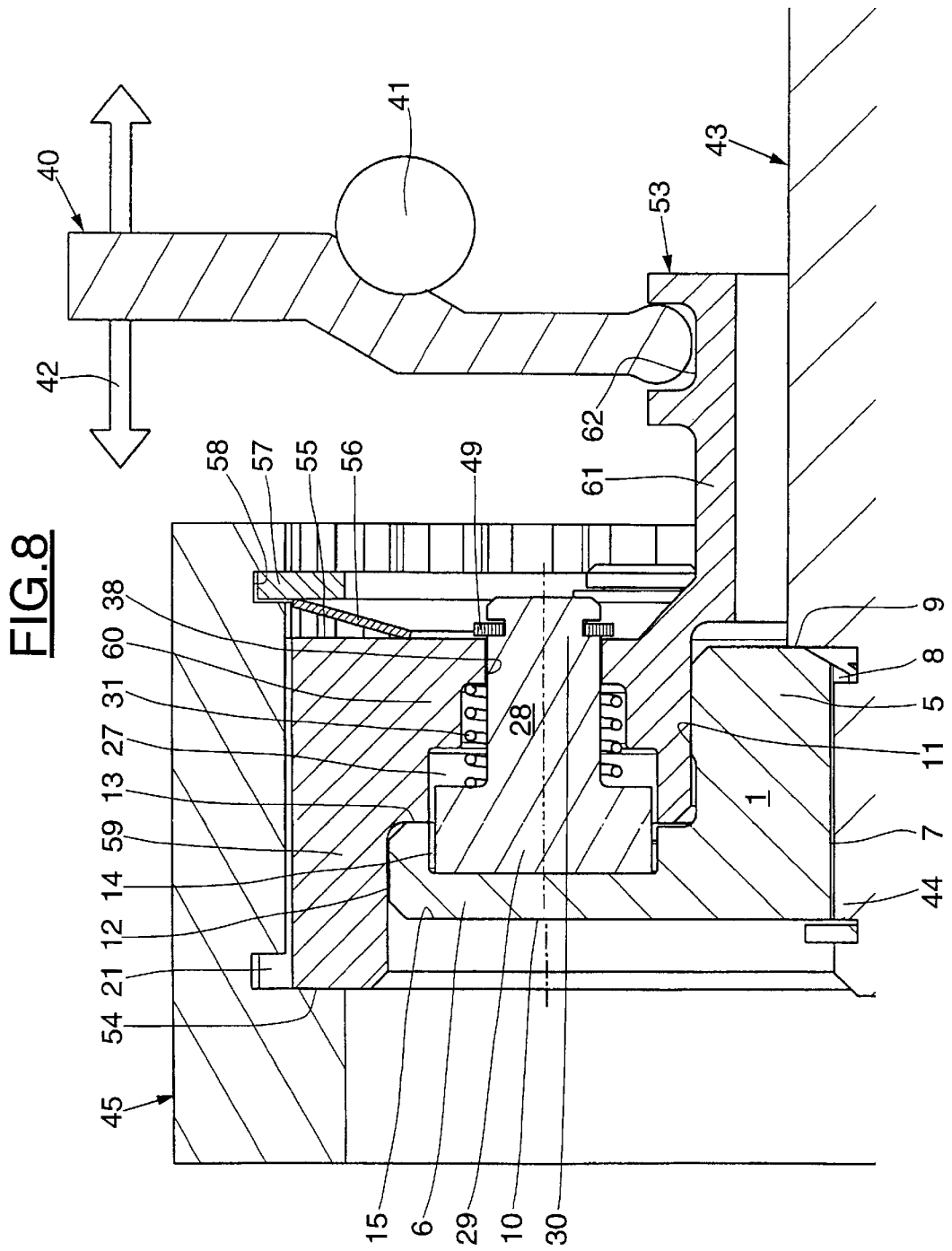
FIG. 8 is an axial half view of a free wheel device according to a third embodiment of the invention.

The embodiment illustrated in FIG. 8 differs from the first embodiment in that the outer plate and the operating plate form a one-piece part referenced 53. The one-piece plate 53 is capable of moving in axial translation with respect to the inner plate 1 over a predetermined axial travel. In the position illustrated in FIG. 8, the free wheel device is in the engaged or unidirectional transmission position. The inner plate 1 and the one-piece plate 53 are brought axially closer together. The ratchets 28 are capable of projecting into the recesses 14, depending on their circumferential position, under the thrust of their respective springs 31. A frontal end surface 54 of the one-piece plate 53 is in contact with a corresponding surface of the outer annulus 45. A radial surface 55 of the opposite side to the radial surface 54 takes the thrust of a washer 56 having axial elasticity, for example of the Belleville washer kind, which bears against a circlip 57 partially housed in an annular groove formed on an inner surface of the outer annulus 45. The one-piece plate 53 comprises, apart from an axial portion 59 and a radial portion 60 respectively similar to the portions 18 and 19 of the embodiment of FIGS. 1 to 5, a control portion 61 extending from a small-diameter end of the radial portion 60, axially away from the inner plate 1. The control portion 61 is provided at its free end with a groove 62 open toward the outside and capable of collaborating with the control lever 40.

If the control lever 40 is pivoted in the direction of the arrow 42 about the spindle or the ball joint 41, the one-piece plate 53 is driven in axial translation in the opposite direction, which causes gradual compression of the washer 56, possibly to the point that it becomes completely flattened giving it a flat radial shape, causes corresponding movement of the ratchets 28 projecting into the recesses 14 of the inner plate 1 and causing them to disengage completely, hence causing operation of free rotation in both directions between the inner plate 1 and the one-piece plate 53.

By ceasing to actuate the control lever 40, the elastic washer 56 returns the one-piece plate 53 to its initial position with contact between its frontal surface 54 and the corresponding radial surface of the outer annulus 45. Under the action of respective springs 31, the ratchets 28 come back into contact with the path of the inner plate 1. The ratchet 28 illustrated in FIG. 8 resumes contact with the bottom 15 of the recess 14. The free wheel device is then in the engaged state, or in other words operates with unidirectional transmission.

It could also be possible, by way of an alternative, to envisage omitting the elastic washer, the return to the engaged position being provided by the control lever 40.

This then provides an extremely simple, compact and inexpensive disengagable free wheel in the form of an assembly that is easy to operate.

What is claimed is:

1. A ratchet free wheel device comprising a first element provided with uniformly distributed cavities, a number of ratchets able to project into said cavities, and a second element for supporting the ratchets so that the second element rotates as one with the first element in one direction of relative rotation of said first and second elements and is free to rotate in an opposite direction of relative rotation, wherein each ratchet comprises a head able to project into said cavities, and which device comprises control means for controlling the ratchets which is capable of preventing said ratchets from projecting into said cavities so that the second element is free to rotate with respect to the first element in two opposite directions of relative rotation of said first and second elements when the control means is active, and each ratchet includes a tail collaborating with said control means.

2. The device as claimed in claim 1 wherein said control means comprises an operating element able to collaborate with the ratchets so as, in an inactive position, to leave them free to project into said cavities and, in an active position, to keep them out of said cavities.

3. The device as claimed in claim 2, wherein said control means includes a control system collaborating with the operating element and determining whether said control means is in the inactive or in the active position.

4. The device as claimed in claim 1, wherein the tail of each ratchet projects from the second element away from said cavities and is equipped with a retaining means capable of collaborating with said control means.

5. The device as claimed in claim 4, wherein the retaining means comprise a washer fixed to the shank of a ratchet, so that a portion of the control means is arranged between the second element and the washer.

6. The device as claimed in claim 1, wherein each ratchet has an axisymmetric shape, the head being cylindrical, and the tail also being cylindrical.

7. The device as claimed in claim 1, wherein each ratchet comprises a radial bearing surface between the head and the tail, a spring being arranged around the tail and bearing against said bearing surface.

8. The device as claimed in claim 7, wherein the spring also bears against the second element and tends to cause each ratchet to project into said cavities.

9. A ratchet free wheel device, comprising:
a first element provided with distributed cavities;
a number of ratchets each having a locking part and a tail section;
a second element supporting said ratchets so that the head sections of said ratchets are adapted to project into said cavities, and said head sections of said ratchets and said cavities being dimensioned such that, when the head sections of said ratchets are received in said cavities, said second element rotates as one with the first element in one direction of relative rotation of said first and second elements while said second element is free to rotate relative to said first element in an opposite direction of relative rotation;
a coupling device which is in driving engagement with the tail sections of said ratchets, and which tail sections are received by and supported by said second element; and
a control system which is in driving engagement with said coupling device, and said control system being adjustable to a first position wherein said coupling device is located to prevent said head sections from projecting into said cavities so that said second element is free to rotate with respect to the first element in two opposite directions of relative rotation of said first and second elements.

10. The device of claim 9 wherein said head sections are formed at one axial end of said ratchets and said tails extend axially away from respective head sections to an opposite axial end, and wherein said tails extend into recesses formed in said second element and into an engagement relationship with respect to said coupling device.

11. The device of claim 9 wherein said ratchets are supported by said second element in a manner which provides for axial adjustment of said ratchets in parallel to an axis of rotation of said first element.

12. The device of claim 9 wherein said coupling device includes a catch section and said control system includes a contact member which is placed in engagement with said catch section, and wherein said contact member includes a pivot support for manipulation of said coupling device along a direction parallel to an axis of rotation of said first element upon rotation of said contact member about said pivot support.

13. The device of claim 9 wherein said tails of said ratchets and said coupling device form a unitary member.

14. The device of claim 9 wherein said tails extend through respective holes formed in said second element and wherein said device further comprises lock members provided at a portion of said tails extending to an opposite side of said second element than a side of the second element positioned closest to the heads of said ratchets.

15. The device of claim 9 further comprising springs in contact with said heads to bias said heads into a cavity reception mode.

16. The device of claim 9 wherein said control system is adjustable between said first mode and a second mode wherein said coupling device is adjusted by said control system to place said heads within said cavities.

17. A ratchet free wheel device comprising a first element provided with uniformly distributed cavities, a number of ratchets able to project into said cavities, a second element for supporting the ratchets so that the second element rotates as one with the first element in one direction of relative rotation of said first and second elements and is free to rotate in an opposite direction of relative rotation, and a means of controlling the ratchets which is capable of preventing them from projecting into said cavities so that the second element is free to rotate with respect to the first element in two opposite directions of relative rotation of said first and second elements when the control means is active, each ratchet comprising a single head able to project into said cavities and a tail collaborating with said control means.

18. The device as claimed in claim 17 wherein said control means comprises an operating element able to collaborate with the ratchets so as, in an inactive position, to leave them free to project into said cavities and, in an active position, to keep them out of said cavities.

19. The device as claimed in claim 18, wherein said control means includes a control system collaborating with the operating element and determining whether said control means is in the inactive or in the active position.

20. The device as claimed in claim 17, wherein the tail of each ratchet projects from the second element away from said cavities and is equipped with a retaining means capable of collaborating with said control means.

21. The device as claimed in claim 17, wherein each ratchet comprises a radial bearing surface between the head and the tail, a spring being arranged around the tail and bearing against said bearing surface.

22. The device as claimed in claim 21, wherein the spring also bears against the second element and tends to cause each ratchet to project into said cavities.

23. A ratchet free wheel device comprising a first element provided with uniformly distributed cavities, a number of ratchets able to project into said cavities, a second element for supporting the ratchets so that the second element rotates as one with the first element in one direction of relative rotation of said first and second elements and is free to rotate in an opposite direction of relative rotation, and a means of controlling the ratchets which is capable of preventing said ratchets from projecting into said cavities so that the second element is free to rotate with respect to the first element in two opposite directions of relative rotation of said first and second elements when the control means is active, each ratchet comprising a cylindrical head able to project into said cavities and a tail collaborating with said control means.

24. The device as claimed in claim 23 wherein said control means comprises an operating element able to collaborate with the ratchets so as, in an inactive position, to leave them free to project into said cavities and, in an active position, to keep them out of said cavities.

25. The device as claimed in claim 24, wherein said control means includes a control system collaborating with the operating element and determining whether said control means is in the inactive or in the active position.

26. The device as claimed in claim 23, wherein the tail of each ratchet projects from the second element away from said cavities and is equipped with a retaining means capable of collaborating with said control means.

27. The device as claimed in claim 23, wherein each ratchet comprises a radial bearing surface between the head and the tail, a spring being arranged around the tail and bearing against said bearing surface.

28. The device as claimed in claim 27, wherein the spring also bears against the second element and tends to cause each ratchet to project into said cavities.

* * * * *